(12) United States Patent
von Alten (10) Patent No.: US 6,751,058 B2
(45) Date of Patent: Jun. 15, 2004

(54) POSITIONING SYSTEM FOR REMOVABLE DATA STORAGE CARTRIDGES

(75) Inventor: Thomas W. von Alten, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/350,430

(22) Filed: Jan. 24, 2003

(65) Prior Publication Data

US 2003/0112557 A1 Jun. 19, 2003

Related U.S. Application Data

(62) Division of application No. 09/577,215, filed on May 23, 2000, now Pat. No. 6,538,842.

(51) Int. Cl.⁷ .............................................. G11B 23/02
(52) U.S. Cl. ...................................................... 360/132
(58) Field of Search .................... 360/132, 93, 133; 369/291

(56) References Cited

U.S. PATENT DOCUMENTS 4,041,537 A * 8/1977 Kishi .......................... 360/60

* cited by examiner

Primary Examiner—George J. Letscher (57) ABSTRACT

A system for positioning a data storage cartridge in a read/write mechanism in which alignment holes in the cartridge are pre-aligned to alignment pins on the read/write mechanism. The system includes a beveled recess in the front surface of the cartridge, a pair of holes in the bottom surface of the cartridge and four alignment pins affixed to the read/write mechanism. The third and fourth alignment pins are oriented perpendicular to and project out toward the second planar surface of the cartridge. The first, second, third and fourth alignment pins are disposed such that when the cartridge reaches the pre-aligned position the first alignment pin bottoms out in the beveled recess, the second alignment pin abuts the first planar surface at a location away from the beveled recess, the third alignment pin is substantially aligned with one of the holes in the second planar surface and the fourth alignment pin is substantially aligned with the other of the holes in the second planar surface.

12 Claims, 8 Drawing Sheets

POSITIONING SYSTEM FOR REMOVABLE DATA STORAGE CARTRIDGES

CROSS REFERENCE TO RELATED APPLICATION

This is a division of application Ser. No. 09/577,215 filed May 23, 2000 now U.S. Pat. No. 6,538,842.

FIELD OF THE INVENTION

The invention relates generally to data storage devices that use removable cartridges and, more particularly, to a system for properly positioning a removable data storage cartridge in a read/write mechanism.

BACKGROUND OF THE INVENTION

A widely used medium for storing data is recording tape, which is typically a polymer tape with a magnetic coating. Tape cartridges are one of the most popular formats for storing data on tape. Tape cartridges are usually smaller and less expensive than reel-to-reel tapes. Two widely used types of tape cartridges are the dual reel cartridge and the single supply reel cartridge. By enclosing the tape within a cartridge, the tape and the data stored on the tape are better protected from damage than the more exposed reel-to-reel tapes. In a dual reel tape cartridge, both the supply reel and the take-up reel are housed in the cartridge. In a single supply reel tape cartridge, the take-up reel is built into the tape drive along with an automatic tape threading mechanism.

In many tape cartridge drive systems, the tape cartridges are carried into the proper position in the tape drive on a tray that moves in and out of the tape drive. The tray moves back and forth between an extended/loading position for receiving a tape cartridge and a retracted/operating position in the drive for positioning the cartridge for read and write operations. A paired hole/slot positioning system is commonly used to accurately position the cartridge in the tape drive as the cartridge is loaded. In this system, a hole and a slot are formed in the bottom of the cartridge along a line parallel to the vertical plane of the front of the cartridge. As the tray moves to the retracted position, it carries the cartridge in and down over a pair of alignment pins affixed to the tape drive. One of the alignment pins projects into the hole in the bottom of the cartridge. The other alignment pin projects into the slot. The hole/slot pair on the cartridge and the alignment pins on the tape drive are located such that when the pins project into the hole and slot, the cartridge and corresponding the tape within the cartridge, will be properly positioned in the tape drive.

In order to accommodate some initial misalignment between the hole and slot and the alignment pins, the edges of the hole and slot are chamfered or the ends of the pins are chamfered, or both. In this way, if the cartridge is not precisely aligned as it drops down over the pins, the beveled edges of the chamfers will move the cartridge into the proper position to receive the alignment pins. The size of the hole/slot and pins and their chamfered edges determines how much misalignment can be accommodated and how much vertical travel is required to get the pins into the hole and slot. Making the hole, slot and pins and their chamfers larger, and increasing the vertical travel, increases the allowable misalignment. It is desirable, however, to minimize or eliminate the vertical travel necessary to properly position the cartridge in the tape drive and to keep the hole, slot and pins and the chamfers as small as possible because all of these factors add cost and complexity to the tape cartridge and the tape drive.

SUMMARY OF THE INVENTION

Accordingly, the present invention is directed to a system for positioning a data storage cartridge in a read/write mechanism in which alignment holes in the cartridge are pre-aligned to alignment structures on the read/write mechanism. The cartridge may be characterized by a first planar surface that fronts the tape drive and a second planar surface perpendicular to and extending away from the first planar surface. The cartridge is movable in a first direction from a loading position to a pre-aligned position in which the cartridge is partially installed in the read/write mechanism and then in a second direction transverse to the first direction from the pre-aligned position to an aligned operating position in which the cartridge is fully installed in the read/write mechanism.

The invented system includes a beveled recess in the first planar surface of the cartridge, a pair of holes in the second planar surface of the cartridge and four alignment structures affixed to the read/write mechanism (first, second, third and fourth alignment structures). The third and fourth alignment structures, typically pins, are oriented perpendicular to and project out toward the second planar surface of the cartridge. The first alignment structure is disposed in the read/write mechanism such that as the cartridge is moved toward the pre-aligned position the first alignment structure abuts the beveled recess. The first, second, third and fourth alignment structures are disposed such that when the cartridge reaches the pre-aligned position the first alignment structure bottoms out in the beveled recess, the second alignment structure abuts the first planar surface at a location away from the beveled recess, the third alignment structure is substantially aligned with one of the holes in the second planar surface and the fourth alignment structure is substantially aligned with the other of the holes in the second planar surface. One or both of the alignment holes on the cartridge and the alignment pins on the read/write mechanism may be chamfered to accommodate any misalignment between the holes and the pins.

The invention may also be embodied in a housing for the cartridge. In this embodiment, the cartridge housing includes a top, a bottom, and a front and sides connecting the top and bottom. A beveled recess is formed in the front of the housing and a flat surface is located on the front of the housing at a position away from the beveled recess. A pair of alignment holes are positioned in the bottom of the housing, preferably along a line parallel to the flat surface on the front of the housing. The beveled recess, flat surface and alignment holes are used in conjunction with alignment structures in the read/write mechanism, as described above for the system embodiment of the invention, to properly align the cartridge when it is installed in the read/write mechanism.

The pre-alignment features of the invention reduce the vertical travel necessary to properly position the data storage cartridge (a tape cartridge, for example) in the read/write mechanism (a tape drive, for example) and to keep the alignment holes on the cartridge and the alignment pins on the read/write mechanism and the chamfers as small as possible.

The various embodiments of the invention may be better understood with reference to the Drawings and the following Detailed Description.

DETAILED DESCRIPTION OF THE INVENTION

The invention will be described with reference to the tape cartridge 10 shown in FIGS. 1–3 and the tape drive 50 shown in FIGS. 4–12. The description of pertinent structural features of each device is followed by a description of the cooperative interaction and operation of the two devices. Generally, the invented tape cartridge 10 includes a beveled recess formed in a flat front face of the cartridge for coarse positioning along with a more precise positioning hole/slot pair in the bottom of the cartridge. These features are used in conjunction with alignment pins or other suitable alignment structures in the tape drive to properly position cartridge 10 in tape drive 50 for read and write operations.

Figure 1:
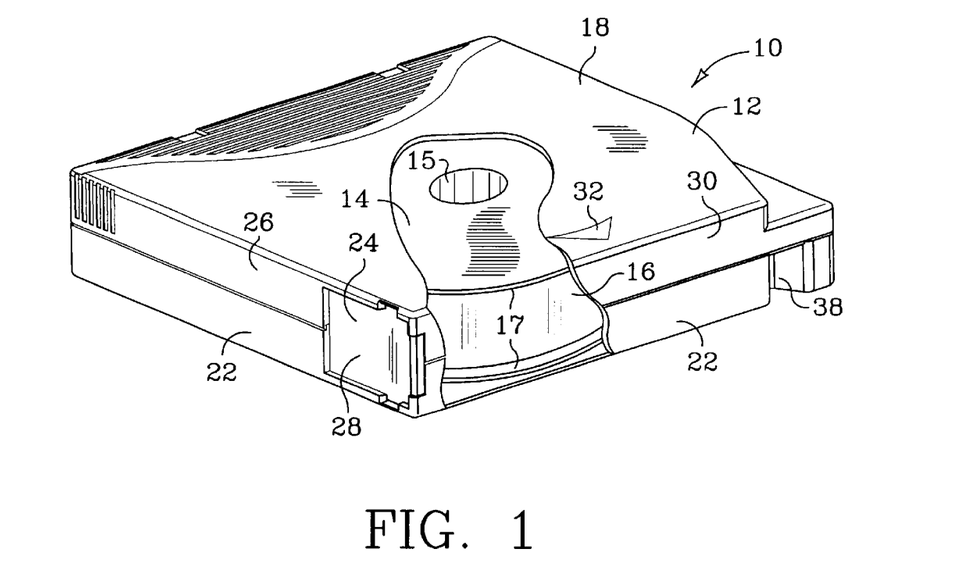
FIG. 1 is a perspective top side view of a single supply reel tape cartridge constructed according to one embodiment of the invention.
Figure 2:
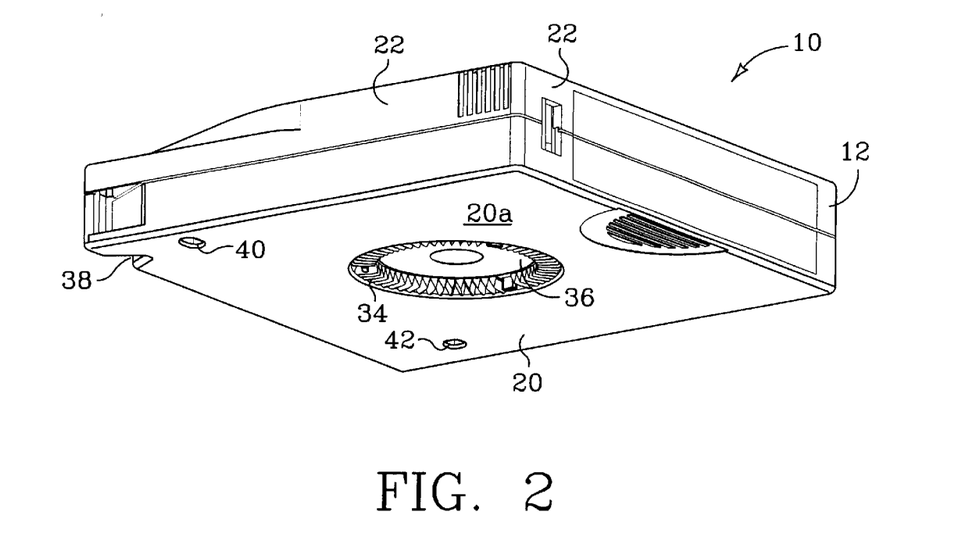
FIG. 2 is a perspective bottom side view of the single supply reel tape cartridge of FIG. 1.
Figure 3:
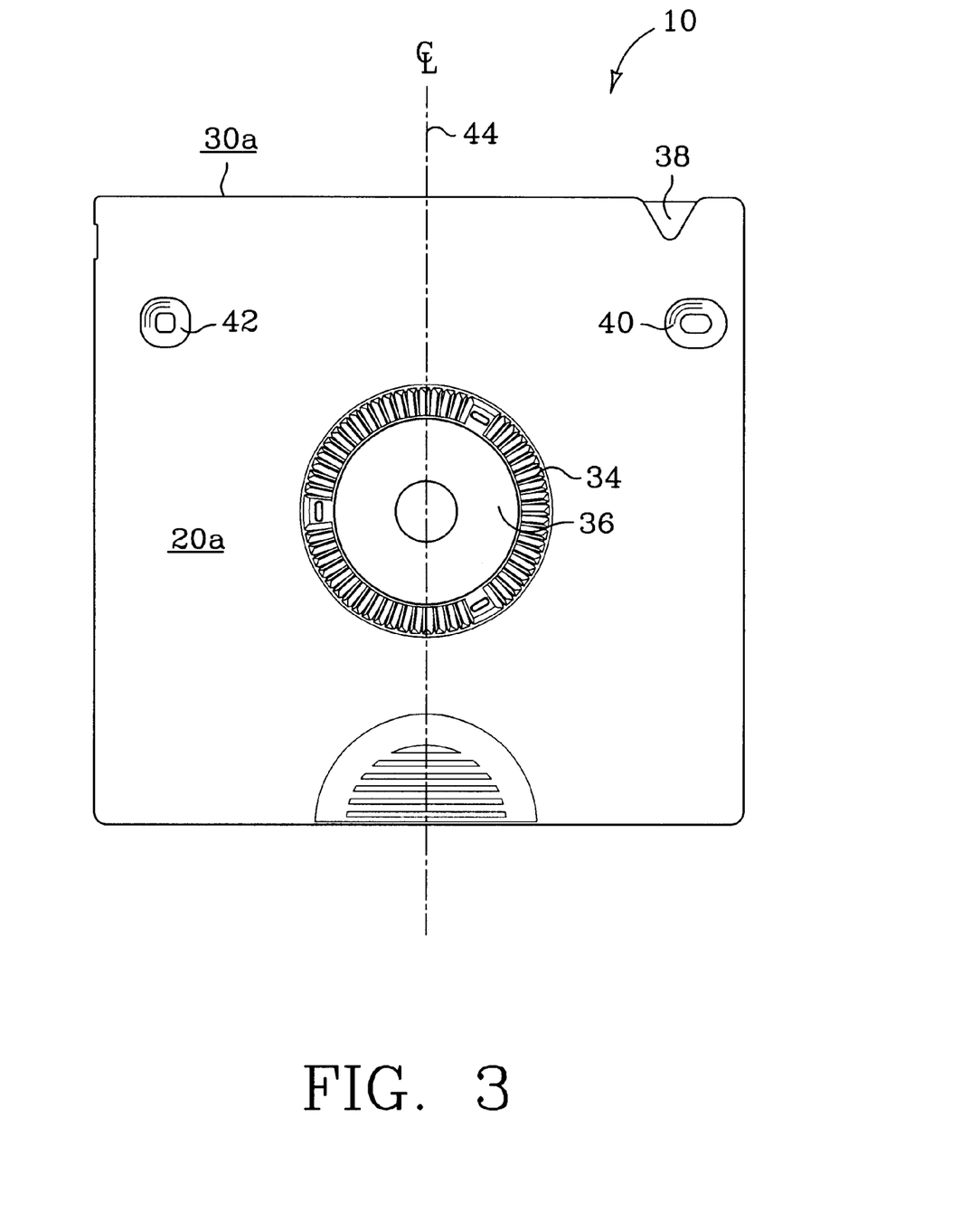
FIG. 3 is a plan view of the bottom of the cartridge of FIG. 1.

Referring first to FIGS. 1–3, a single reel tape cartridge 10 includes a housing 12, a tape supply reel 14 and tape 16. Reel 14 and tape 16 are shown in the cut-away portion of FIG. 1. Reel 14 includes a hub 15 and flanges 17 extending out from hub. Housing 12 is a generally rectangular box-like structure configured to enclose a single reel of tape. Housing 12 includes a top 18, a bottom 20 and sidewalls 22 extending between the top and bottom. Tape 16 is accessible to a tape drive through access window 24 on left side 26 of housing 12. A door 28 covers access window 24 when cartridge 10 is not installed in a tape drive. Door 28 is pushed open and held open when cartridge 10 is installed in the tape drive.

Cartridge 10 is installed in the tape drive front side 30 first as indicated by arrow 32 in FIG. 1. Housing bottom 20 and front side 30 each include planar surfaces 20a and 30a respectively. Planar surfaces 20a and 30a are perpendicular to one another.

A circular gear 34 is exposed through opening 36 in the bottom 20 of housing 12. Gear 34, which is coupled to reel 14, provides the operative interface between the tape drive and cartridge 10. Gear 34 is engaged by a mating coaxial gear in the drive mechanism of the tape drive to rotate reel 14.

A beveled recess 38 is formed in a part of front planar surface 30a of housing 12. A pair of alignment holes 40 and 42 are formed in bottom planar surface 20a of housing 12. It is desirable, although not necessary, that holes 40 and 42 be spaced apart as far as practicable across bottom 20 as measured along a line parallel to front planar surface 30a or along a line parallel to a centerline 44. Typically, holes 40 and 42 will be located along a line parallel to front planar surface 30a near front side 30 or along a line parallel to a centerline 44 near side 26.

Planar surfaces 20a and 30a are called out specifically to distinguish other structural features that may be included in bottom 20 and side 30 of housing 12. Planar surfaces 20a and 30a may be very small covering only a minute part of the bottom 20 or side 30 of housing 12, or they may be much larger covering most of the bottom 20 or side 30 of housing 12. For example, planar surface 30a need only present sufficient surface area to abut the corresponding alignment structure on tape drive 50 as described below. Planar surface 20a may be two non-contiguous areas localized at alignment holes 40 and 42. In any case, when cartridge 10 is correctly positioned in the tape drive, planar surface 20a is parallel to a first reference plane, designated the A datum, and planar surface 30a is parallel to a second reference plane, designated the B datum. The A and B datum planes are each perpendicular to a third reference plane, designated the C datum.

Referring now to FIGS. 4–12, tape drive 50 illustrates generally the configuration of a tape drive typical of those used with single spool tape cartridges, except that tape drive 50 has been adapted for use with the present invention. Tape drive 50 includes tape guides 52 and 54, a magnetic read/write head 56, a take up spool 58 and a cartridge holder 60. When tape cartridge 10 is inserted into tape drive 10 for read and write operations, the tape (not shown) passes around first tape guide 52, over magnetic read/write head 56, around second tape guide 54 to take up spool 58. Head 56 is mounted to a carriage and actuator assembly 62 that positions head 56 over the desired track or tracks on the tape.

The invention utilizes four alignment structures 64, 66, 68 and 70 in tape drive 50. Each of these alignment structures is affixed to the housing, chassis or other stationary part of the tape drive. First and second alignment structures 64 and 66 and third and fourth alignment structures 68 and 70 are positioned on opposite sides of the front to back centerline 44 of cartridge housing 12 as determined when cartridge 10 in installed in tape drive 50. In addition, third and fourth alignment structures 68 and 70 are positioned along a line parallel to the B datum. This configuration of third and fourth alignment structures 68 and 70 in tape drive 50 and alignment holes 40 and 42 ensures that front planar surface 30a is parallel to the B datum when alignment holes 40 and 42 in cartridge 10 drop down over third and fourth alignment structures 68 and 70.

First alignment structure 64 will abut recess 38 in cartridge 10 to help align cartridge 10 to the B and C datums and to position holes 40 and 42 over pins 68 and 70 along the B datum (from side to side). First alignment structure 64, therefore, must be stationary in a plane parallel to the A datum. First alignment structure 64 may be a vertically projecting pin as depicted in the Figures, a horizontally projecting bar, or any other structure suitably configured to project into and abut recess 38 in cartridge 10.

Second alignment structure 66 will abut front planar surface 30a of cartridge 10 to help align cartridge 10 to the B and C datums. However, because second alignment structure 66 does not locate the cartridge from side to side (first alignment structure 64 does this as it projects into and abuts recess 38), second alignment structure 66 need only be stationary from front to back. That is to say, second alignment structure 66 can move up and down and side to side within the confines of front planar surface 30a, but it can't move front to back. Second alignment structure 66 may be a vertically projecting pin as depicted in the Figures, a horizontally projecting bar, or any other structure suitably configured to abut front planar surface 30a of cartridge 10.

Third and fourth alignment structure 68 and 70 will project into holes 40 and 42 in bottom planar surface 20a of cartridge 10 to precisely align cartridge 10 to the B and C datums. Third and fourth alignment structures 68 and 70, therefore, must be stationary in a plane parallel to the A datum. That is to say, third and fourth alignment structures 68 and 70 can move up and down within the confines of holes 40 and 42, but they can't move front to back or side to side. Third and fourth alignment structures 68 and 70 are usually vertically projecting pins as depicted in the Figures, but any other structure suitably configured to project into holes 40 and 42 can be used.

The alignment structures 64, 66, 68 and 70 will now be referred to for convenience simply as alignment pins. In the embodiment shown in FIGS. 4–12, chamfered alignment pins 68 and 70 are used instead of the chamfered holes of the cartridge illustrated in FIG. 3. Either or both of alignment pins 68, 70 and holes 40, 42 may be chamfered as necessary or desirable to accommodate misalignment between the pins and the holes.

Recess 38 in front planar surface 30a of cartridge housing 12 is used to help align cartridge 10 to the B and C datums. The front to back depth of recess 38 is used to help align cartridge 10 to the B datum in conjunction with first and second alignment pins 64 and 66 in tape drive 50. The purpose of this comparatively coarse prealignment is to minimize the misalignment tolerance between holes 40, 42 and alignment pins 68 and 70. Minimizing this misalignment tolerance reduces the vertical travel required to precisely align cartridge 10 on pins 68 and 70.

Figure 4:
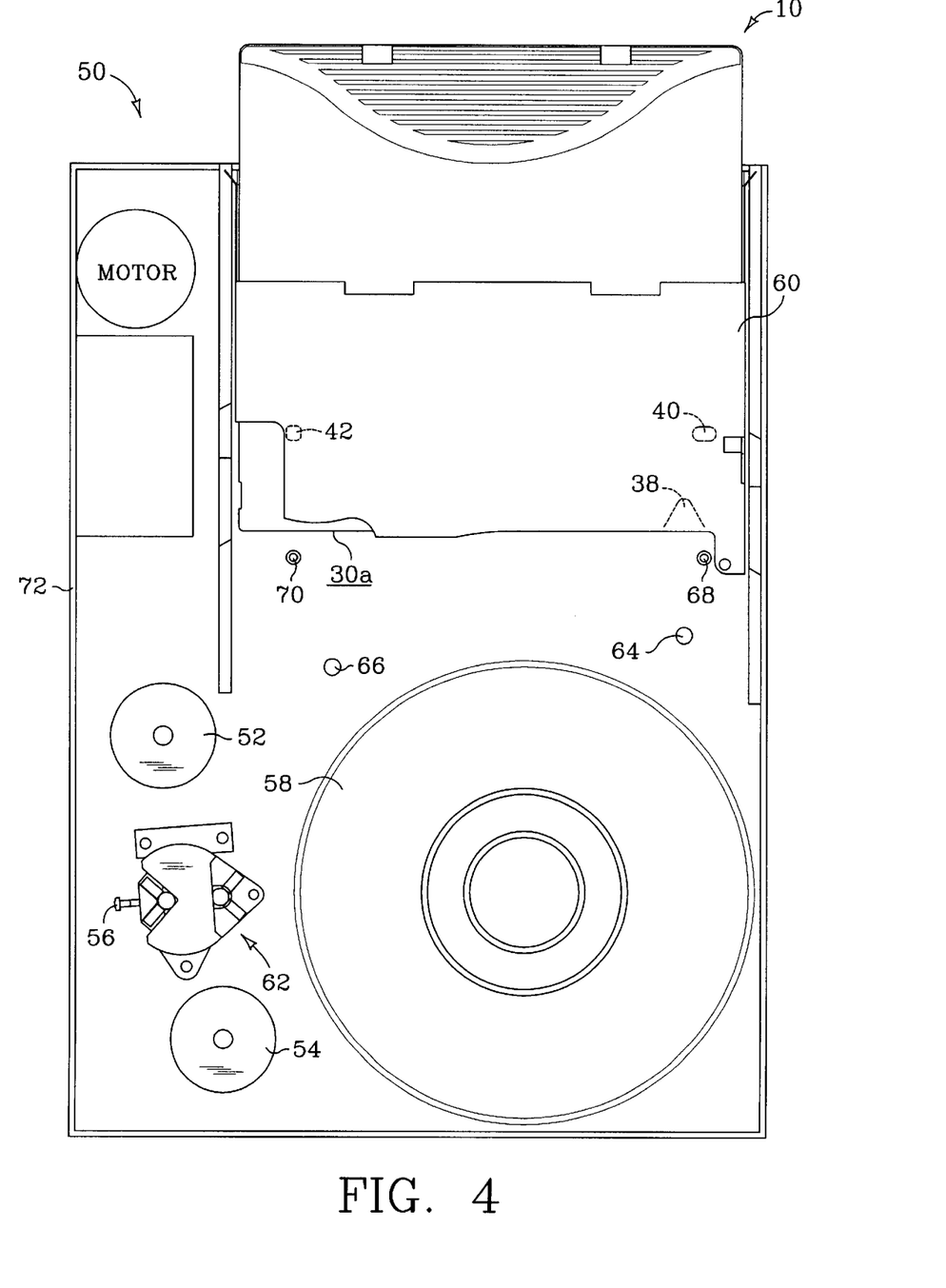
FIGS. 4, 5 and 6 are top down plan views of a tape drive constructed according to a second embodiment of the invention showing in sequence the installation of a tape cartridge.
Figure 5:
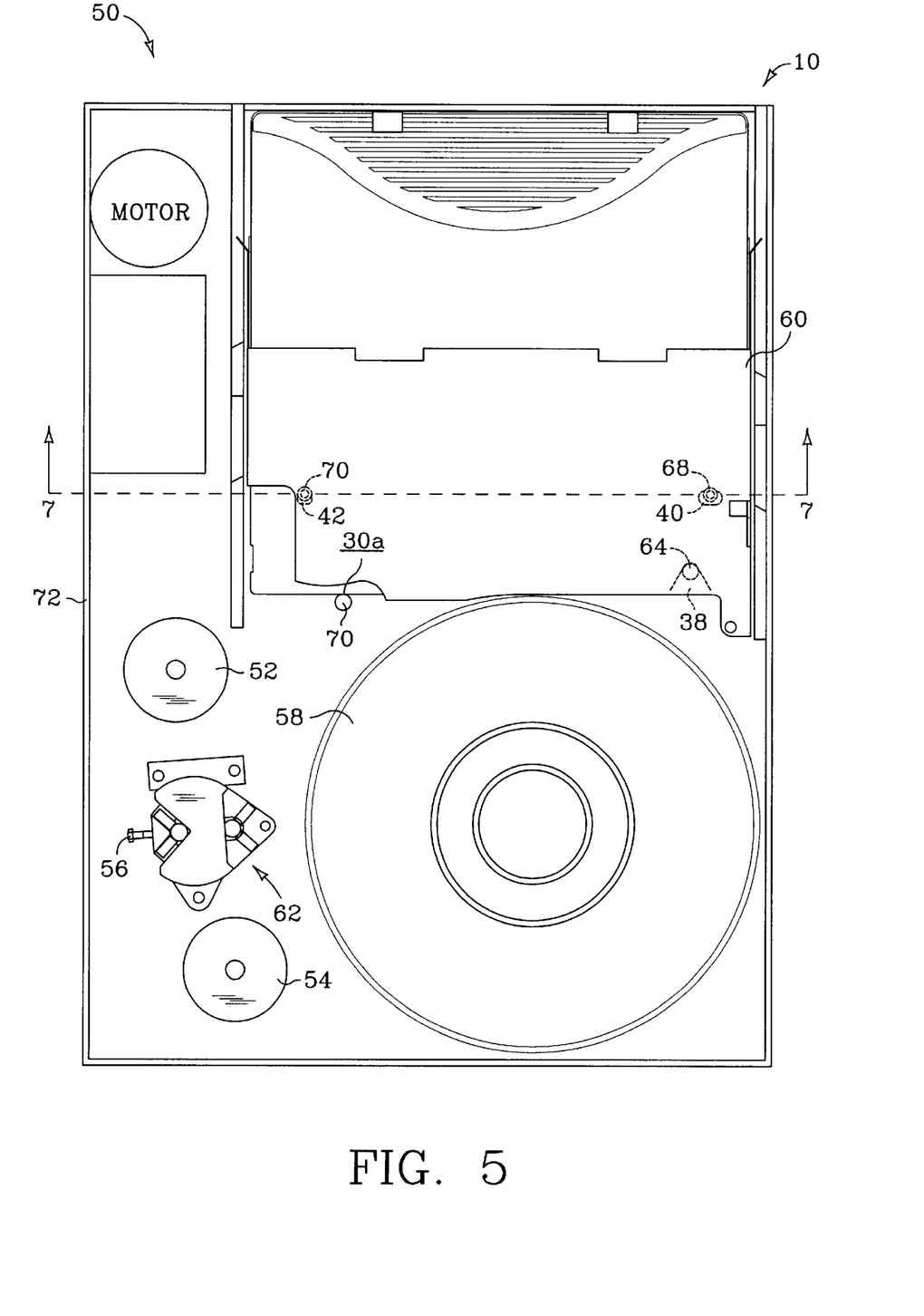
Figure 10:
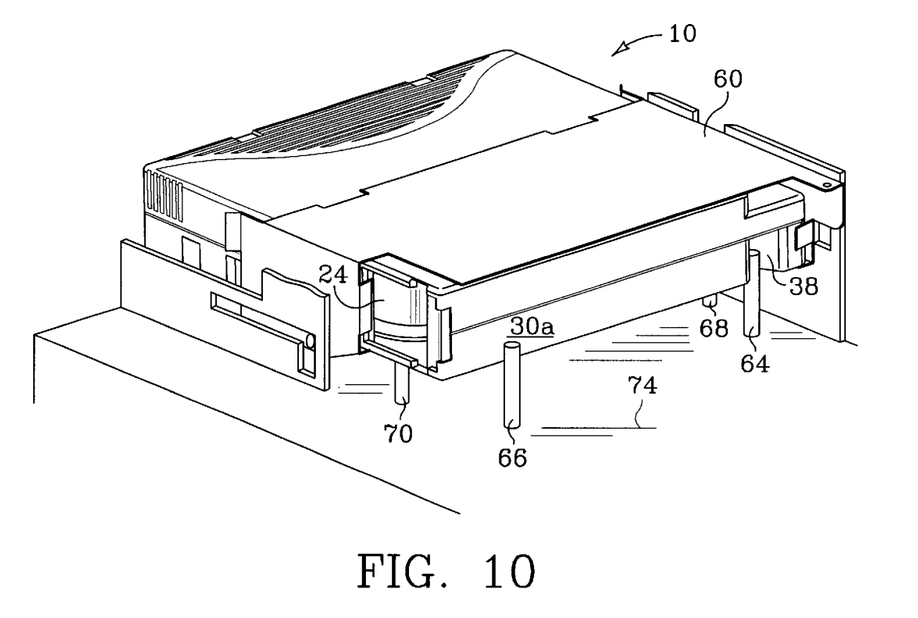
Figure 11:
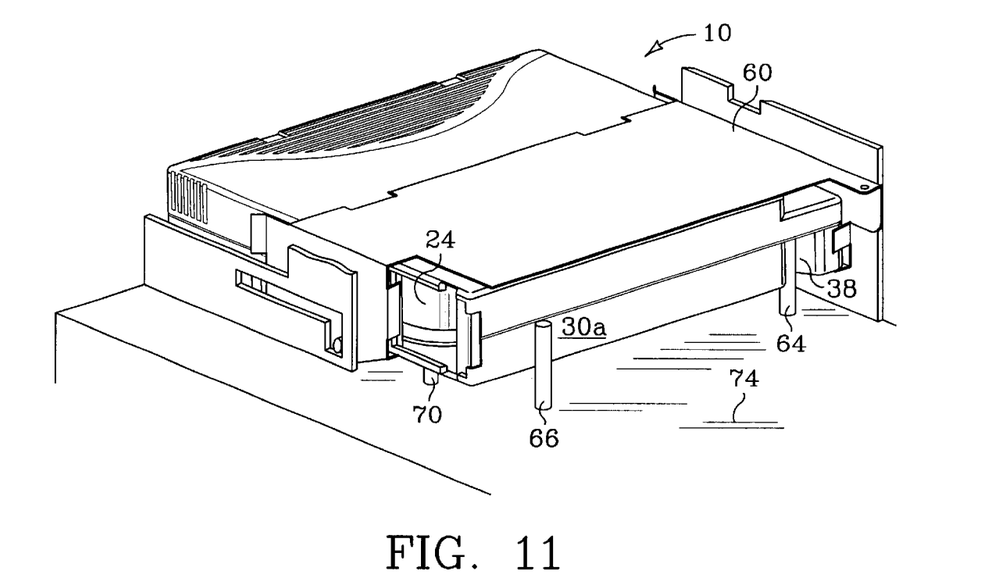

Referring now to the motion depicted by comparing FIGS. 4/5 and 9/10, as holder 60 is retracted into tape drive 50 to move cartridge 10 to the operating position, first and second alignment pins 64 and 66 abut the front side 30 of cartridge 10 at recess 38 and planar surface 30a, respectively. Holder 60 is retracted horizontally until first alignment structure 64 bottoms out in recess 38 and second alignment structure 66 abuts planar surface 30a, as shown in FIGS. 5 and 10. First alignment structure 64 is positioned behind second alignment structure 66 a distance equal to the depth of recess 38 so that first alignment structure 64 bottoms out in recess 38 at the same time second alignment structure 66 abuts planar surface 30a. At this point, front planar surface 30a is generally aligned with the B datum. In some cases it may be desirable, as shown in FIG. 5, to intentionally misalign third and fourth alignment pins 68 and 70 slightly behind holes 40 and 42. This misalignment is used to draw cartridge 10 back slightly away from pins 64 and 66 as cartridge 10 is moved down to the fully installed operating position.

Figure 6:
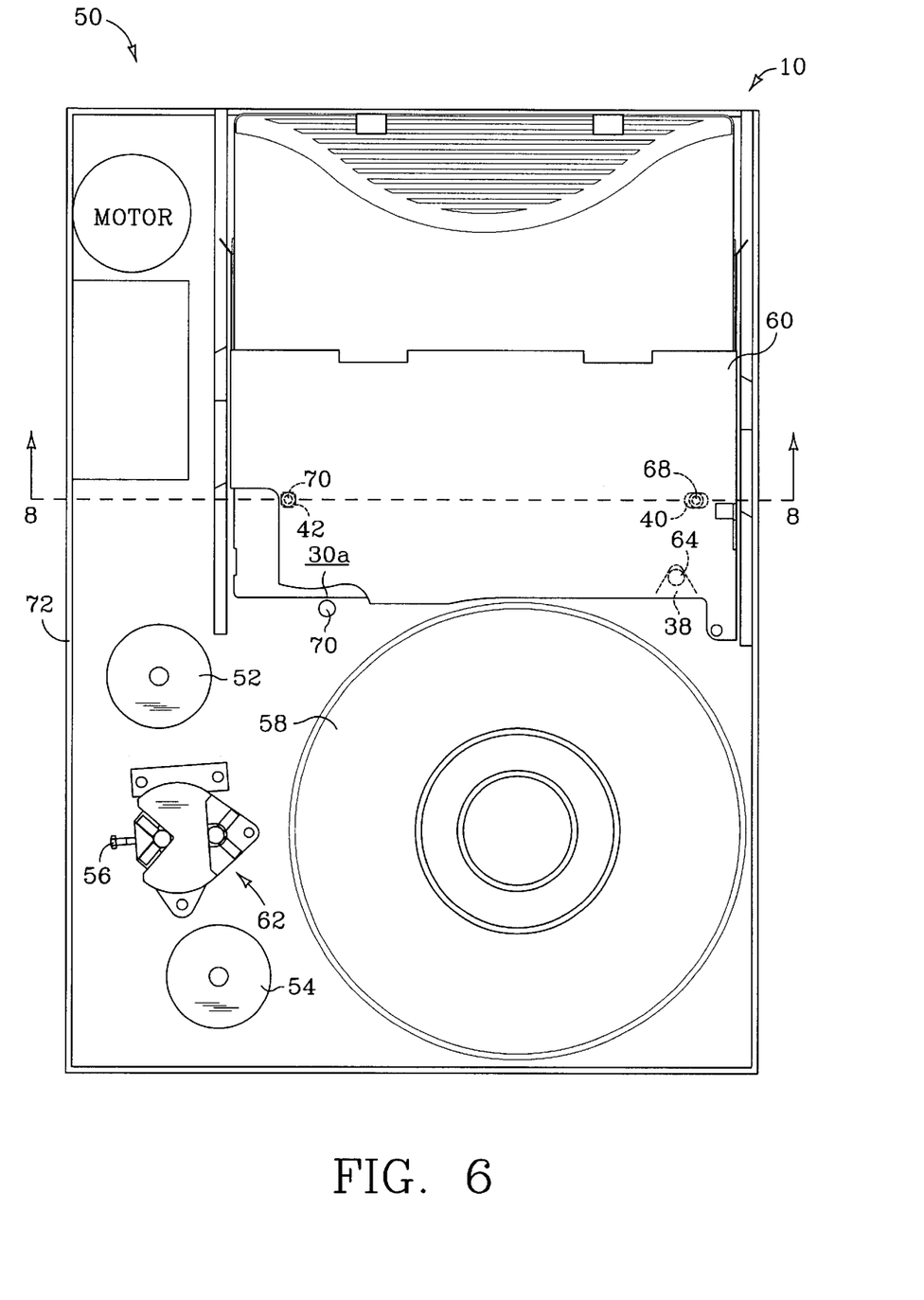
Figure 7:
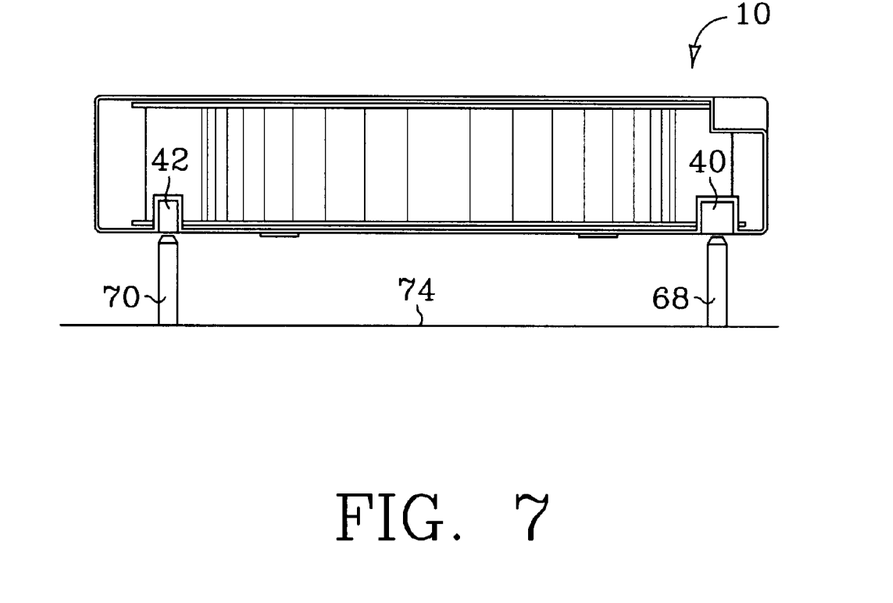
FIG. 7 is a cross section view taken along the line 7—7 in FIG. 5.
Figure 8:
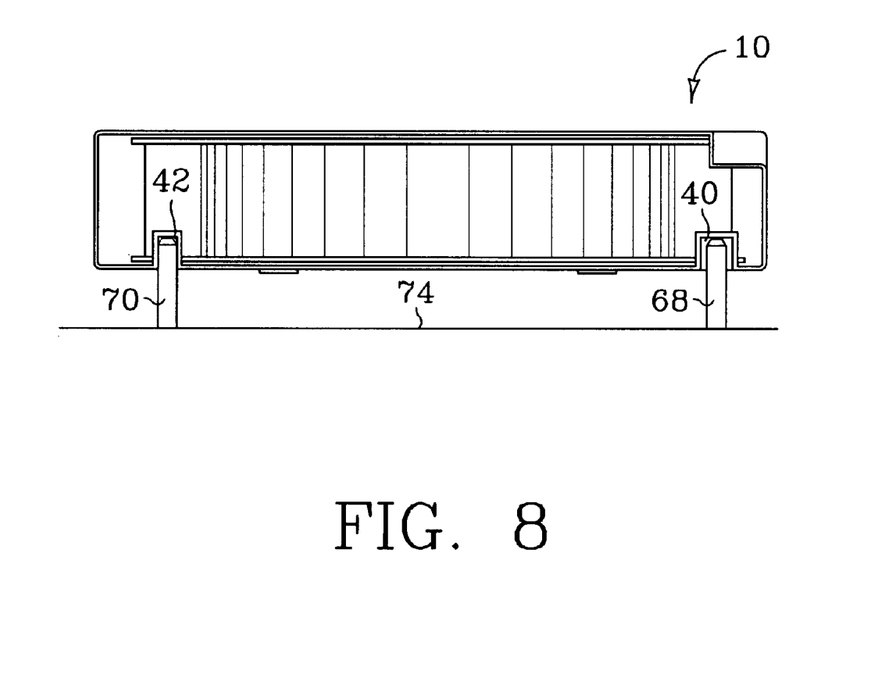
FIG. 8 is a cross section view taken along the line 8—8 in FIG. 6.
Figure 9:
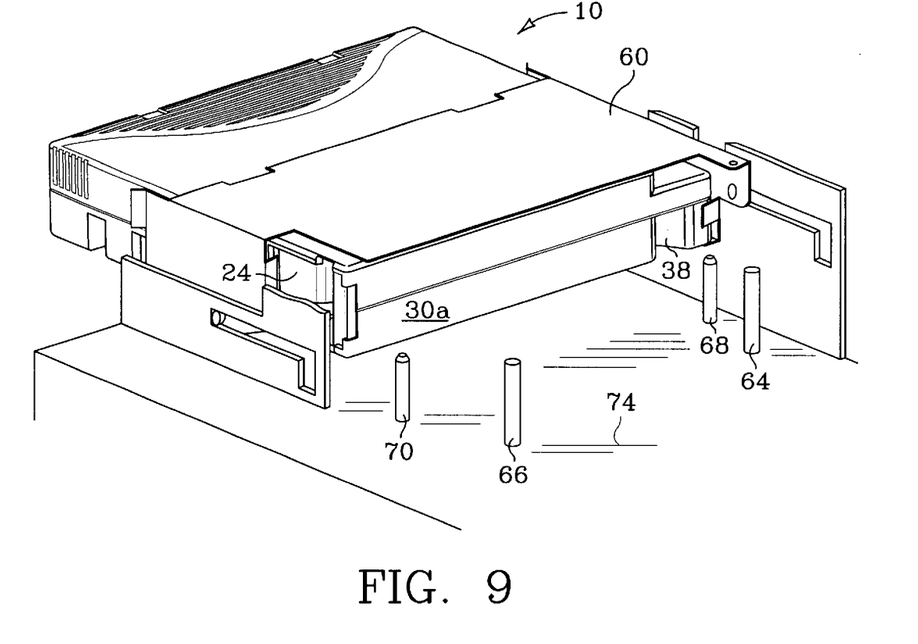
FIGS. 9–12 show in sequence the installation of a tape cartridge into the tape drive of FIG. 4 from a perspective view.
Figure 12:
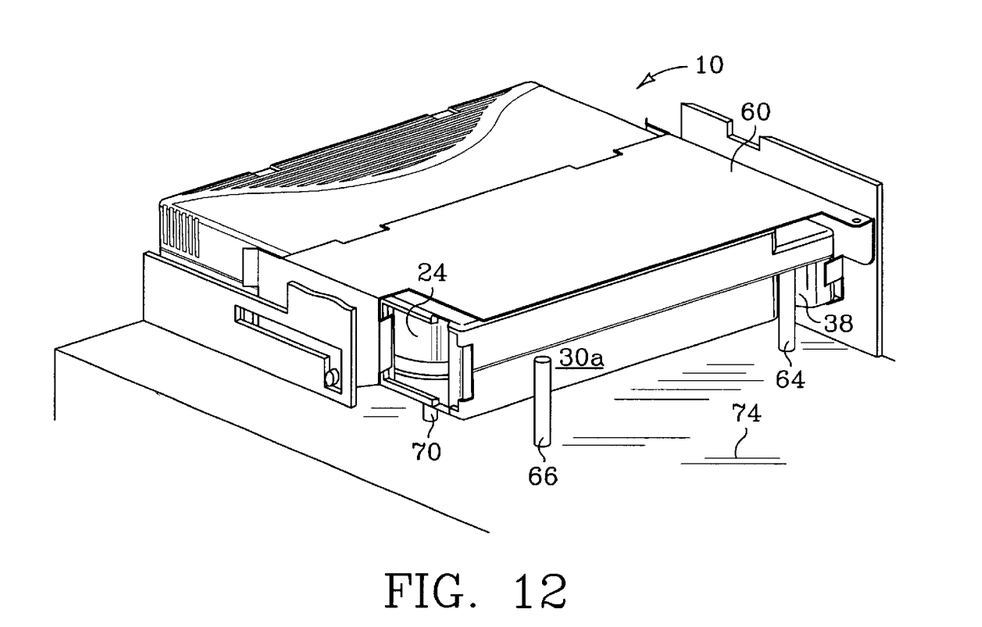

Next, holder 60 is moved down to position cartridge 10 on alignment pins 68 and 70. This movement is seen by comparing FIGS. 5/6, 7/8 and 10/11/12. The slight misalignment noted above causes the chamfered pins 68 and 70 to draw cartridge 10 back slightly as the pins slide into holes 40 and 42. The final position of cartridge 10 is shown in FIGS. 6, 8 and 12.

The bevel of recess 38 positions holes 40 and 42 over pins 68 and 70 along the B datum (from side to side). If first alignment structure 64 is misaligned to the center of recess 38, cartridge 10 will move from side to side as the bevel of recess 38 is driven against alignment pin 64 until alignment structure 64 bottoms out at the center of recess 38. It is desirable, therefore, to bevel recess 38 on both sides to form the V shaped slot shown in the Figures to accommodate misalignment of first alignment structure 64 to either side of the center of recess 38. Also, if first alignment structure 64 is formed as a vertically projecting pin, then V shaped recess 38 must be open to the bottom 20 of housing 12 to allow cartridge 10 to slide freely up against first alignment structure/pin 64 at recess 38.

First and second alignment pins 64 and 66 are positioned on opposite sides of the front 30 of housing 12, preferably as far apart as possible to optimize B and C datum prealignment. Correspondingly, it is desirable to locate recess 38 as far as possible to the side of front side 30 of housing 12. Front planar surface 30a need not be continuous across the front of cartridge housing 12. Indeed, front planar surface 30a need not exist at all. What is important is that when first alignment structure 64 bottoms out in recess 38 and second alignment structure 66 abuts some structural feature on the front 30 of cartridge housing 12, then cartridge 10 is substantially aligned with the B and C datums and holes 40 and 42 are positioned over pins 68 and 70. "Substantially aligned" means good enough to align pins 68 and 70 within the chamfer reach of holes 40 and 42 (or the chamfer reach of pins 68 and 70 if the pins are chamfered).

While it is expected that front 30 of cartridge housing 12 will usually include a tangible planar surface, such a tangible surface is not necessary to the invention. Hence, the term planar surface should be construed broadly to include both a tangible planar surface and an intangible plane that extends across an irregular non-planar front 30, side 26, top 18 or bottom 20 of cartridge housing 12. One of the holes 40 or 42 may be a slot as long as the long axis of the slot is coincident to the line between the two holes.

The invention as shown and described in these illustrative embodiments includes the steps and structures necessary for understanding and explaining the structure and use of the invention. Other typical steps and structures that are normally related to the use of a tape cartridge and a tape drive that are well known to one skilled in the art but that are not essential to understanding the invention are not described in detail. Although the positioning system of the present invention has been described with reference to a single reel tape cartridge such as the one illustrated in FIG. 1, the system may be used in various other types of removable data storage cartridges and devices. Also, the tape cartridge has been described with reference to top, bottom and sides. These generally planar surface descriptions, however, are not intended to limit the invention to horizontally oriented tape drives in which tape cartridges are inserted with the gear opening down. The invention is equally applicable to vertically oriented tape drives or tape drives that might be skewed to the horizontal or vertical planes. Hence, relative terms like top and bottom or up and down should be construed broadly to include comparable features on any data storage cartridge or device without regard to its operationally orientation. It will, therefore, be understood that modifications to and variations on the embodiments shown and described are possible without departing from the scope of the invention which is defined in the following claims.

What is claimed is:

1. A housing for a data storage medium, comprising:
   a structure configured to enclose a data storage medium, the structure including a top, a bottom, and a front and sides connecting the top and bottom;
   a beveled recess in the front of the housing;
   a flat surface on the front of the housing, the flat surface at a location away from the beveled recess;
   a pair of chamfered holes in the bottom of the housing, the holes spaced apart from one another in a direction parallel to the flat surface on the front of the housing.

2. A housing according to claim 1, wherein the holes are aligned along a line parallel to the flat surface on the front of the housing.

3. A housing according to claim 1, wherein the holes are positioned on opposite sides of a line extending along the center of the housing perpendicular to the flat surface on the front of the housing.

4. A housing according to claim 1, wherein the flat surface and the beveled recess are positioned on opposite sides of a line extending along the center of the housing perpendicular to the flat surface on the front of the housing.

5. A housing according to claim 1, wherein the beveled recess comprises a V shaped recess.

6. A housing according to claim 1, wherein one of the chamfered holes comprises a chamfered slot.

7. A tape cartridge, comprising:
   a housing having a top, a bottom, and a front and sides connecting the top and bottom;
   a reel rotatably disposed in the housing, the reel having a hub and a plurality of spaced apart parallel flanges extending out from the hub;
   a tape drive interface on the reel, the tape drive interface accessible through an opening in the bottom of the housing and operative to drivingly couple the reel to a tape drive so that the tape drive can rotate the reel in the housing;
   a beveled recess in the front of the housing;
   a flat surface on the front of the housing, the flat surface at a location away from the beveled recess; and
   a pair of chamfered holes in the bottom of the housing, the holes spaced apart from one another in a direction parallel to the flat surface on the front of the housing.

8. A housing according to claim 7, wherein the holes are aligned along a line parallel to the flat surface on the front of the housing.

9. A housing according to claim 7, wherein the holes are positioned on opposite sides of a line extending along the center of the housing perpendicular to the flat surface on the front of the housing.

10. A housing according to claim 7, wherein the flat surface and The beveled recess are positioned on opposite sides of a line extending along the center of the housing perpendicular to the flat surface on the front of the housing.

11. A housing according to claim 7, wherein the beveled recess comprises a V shaped recess.

12. A structure for positioning a tape cartridge in a tape drive, comprising:
    a beveled recess in a front part of the cartridge;
    a pair of holes in a bottom part of the cartridge, the holes spaced apart from one another in a direction parallel to the front part of the cartridge;
    a first alignment structure on the tape drive, the first alignment structure configured to abut the beveled recess when the cartridge is installed in the tape drive;
    a second alignment structure on the tape drive, the second alignment structure configured to extend into one of the holes in the bottom of the cartridge when the cartridge is installed in the tape drive; and
    a third alignment structure on the tape drive, the third alignment structure configured to extend into the other hole in the bottom of the cartridge when the cartridge is installed in the tape drive flat surface on the front part of the cartridge at a location away from the beveled recess; and a fourth alignment structure on the tape drive, the fourth alignment structure configured to abut the flat surface on the front part of the cartridge when the cartridge is installed in the tape drive.

* * * * *